United States Patent [19]

Tyson

[11] 4,279,482

[45] Jul. 21, 1981

[54] ILLUMINATION OF REPLICAS OF BIOLOGICAL SURFACE TISSUE

[75] Inventor: Don R. Tyson, North Hollywood, Calif.

[73] Assignee: Redken Laboratories, Inc., Canoga Park, Calif.

[21] Appl. No.: 8,884

[22] Filed: Feb. 2, 1979

Related U.S. Application Data

[63] Continuation-in-part of Ser. No. 837,766, Sep. 29, 1977, abandoned.

[51] Int. Cl.³ .............................................. G03B 21/06
[52] U.S. Cl. ...................................... 353/65; 353/39; 350/238; 350/91; 356/71
[58] Field of Search .................... 350/9, 12, 13, 86, 87, 350/90, 91, 144, 238, 239; 356/12, 13, 244–271; 272/8 R, 8 D, 8 P, 10; 353/39, 29, 65, 67; 362/32; 340/146.3 E

[56] References Cited

U.S. PATENT DOCUMENTS

| 1,267,862 | 5/1918 | Haefliger | 350/86 |
|---|---|---|---|
| 2,146,506 | 2/1939 | Maisch | 350/87 |
| 2,170,967 | 8/1939 | Eppenstein et al. | 353/39 |
| 2,208,882 | 7/1940 | Graff et al. | 350/86 |
| 3,229,570 | 1/1966 | Erban | 353/39 |
| 3,785,073 | 1/1974 | Tine | 350/238 X |
| 3,865,488 | 2/1975 | Del Rio | 356/71 |
| 3,900,252 | 8/1975 | Di Salvo et al. | 353/39 |
| 3,989,379 | 11/1976 | Eickhorst | 350/91 X |

FOREIGN PATENT DOCUMENTS

| 579789 | 6/1933 | Fed. Rep. of Germany | 350/86 |
|---|---|---|---|
| 841673 | 7/1960 | United Kingdom | 350/238 |
| 961762 | 6/1964 | United Kingdom | 350/91 |

*Primary Examiner*—Harry N. Haroian
*Attorney, Agent, or Firm*—Christie, Parker & Hale

[57] ABSTRACT

A replica of biological surface tissue with negative topography lying on a platform is illuminated by means of light from a light source disposed inside a base on which the platform is mounted. Illuminating light from the source is transmitted to a location above the platform from which it is directed onto the platform such that the illuminating light impinges upon the replica at an angle approximately between 20° and 42° to the surface of the replica. Preferably, the illuminating light is transmitted by a fiber optical bundle and/or mirrors with flat or varying focal lengths. The platform is rotatable and tiltable, and is adjusted for viewing of the replica with positive topography. The illuminated replica is magnified by a microscope and projected thereby onto a screen for observation.

5 Claims, 3 Drawing Figures

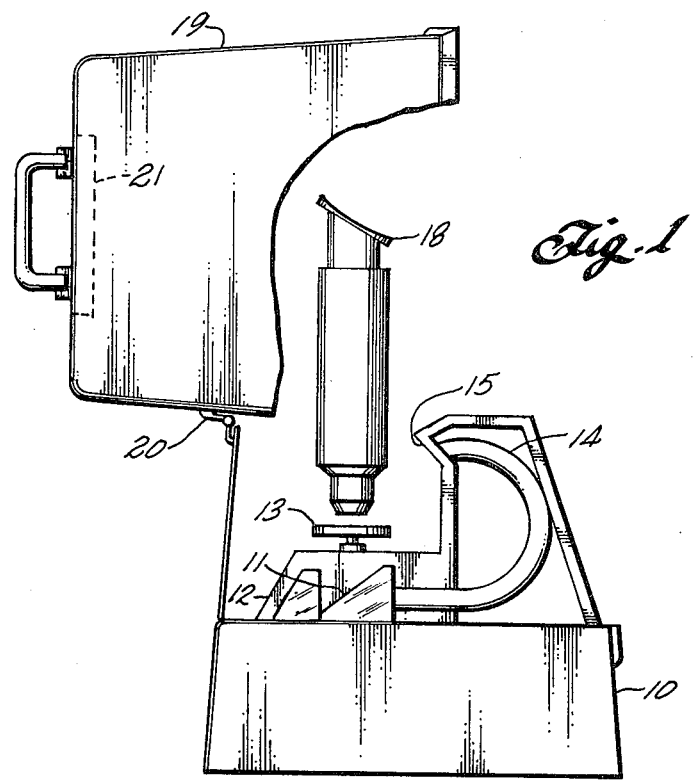
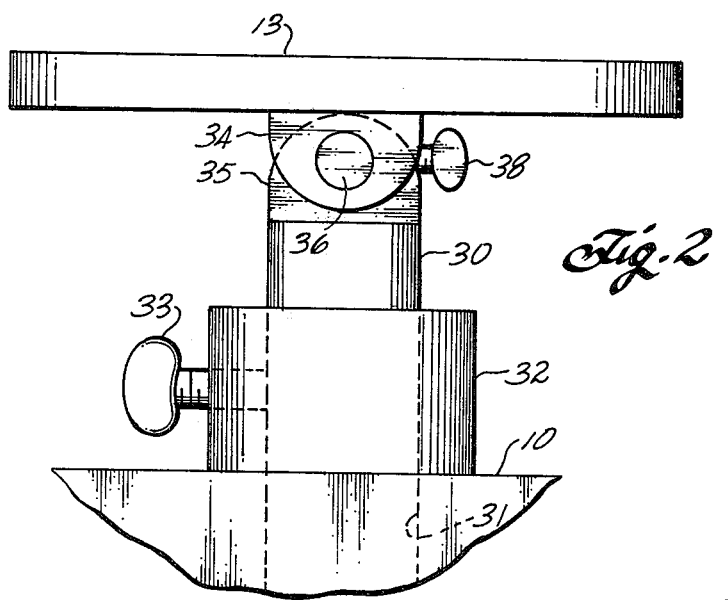
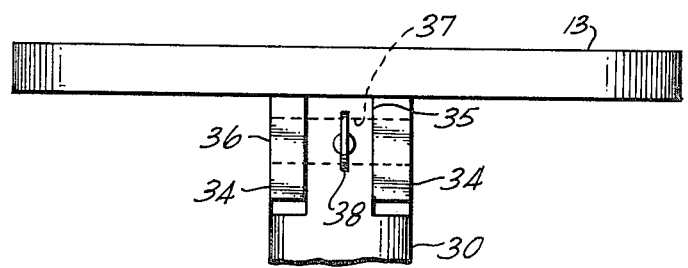

ILLUMINATION OF REPLICAS OF BIOLOGICAL SURFACE TISSUE

This application is a continuation-in-part of application Ser. No. 837,766, filed Sept. 29, 1977, now abandoned.

BACKGROUND OF THE INVENTION

This invention relates to analyzing replicas of biological surface tissue such as skin or nails and, more particularly, to a method for illuminating such replicas for the purpose of analysis.

To evaluate the before and after effects of cosmetic products or medical treatment on human surface tissue such as the epidermis of skin and nails, it is useful to analyze positive or negative replicas of such surface tissue. U.S. Pat. No. 3,900,252, which issued Aug. 19, 1975, in the names of Di Salvo and Yates, and is assigned to the assignee of the present application, discloses apparatus for analyzing human hair. The apparatus has a base on which a microscope is mounted. Illuminating light rays from a source disposed inside the base is transmitted upwardly to back illuminate a specimen in the field of view of the microscope. A cover, which is hinged to the base, fits over the microscope. A projection screen is mounted inside the cover such that the microscope projects images in its field of view onto the screen when the cover is open.

SUMMARY OF THE INVENTION

The invention is particularly well suited for use in connection with the apparatus disclosed in the above-referenced patent of DiSalvo and Yates, but it can also be practiced in connection with other illuminating, viewing, and/or projecting apparatus.

Specifically, coherent light is directed onto a specimen viewing platform to illuminate a replica of biological surface tissue such as skin or nail with negative topography lying thereon. Preferably, the replica is magnified for viewing purposes, and the light is directed to impinge upon the replica at an angle approximately between 20° and 42° to the surface of the replica. The direction from which the light approaches the replica is adjusted until the replica appears with positive topography, i.e., the contour of the original tissue specimen.

BRIEF DESCRIPTION OF THE DRAWING

The features of a specific embodiment of the best mode contemplated of carrying out the invention are illustrated in the drawings, in which:

FIG. 1 is a side sectional view of apparatus for carrying out the invention;

FIG. 2 is an enlarged side elevation view of the specimen viewing platform of FIG. 1; and FIG. 3 is a front elevation view of the platform shown in FIG. 2.

DETAILED DESCRIPTION OF THE SPECIFIC EMBODIMENT

The disclosure of DiSalvo and Yates U.S. Pat. No. 3,900,252 is incorporated herein fully by reference.

In FIG. 1, a source of coherent light, which could comprise the source disclosed in the referenced patent, is disposed inside a base 10. One short side of a right angle prism or mirror 11 is mounted on the top of base 10 over an opening (such as opening 46 in the referenced patent) through which the coherent light passes. A support structure 12 is also mounted on the top of base 10. A specimen viewing platform 13 is tiltably and rotatably attached to support structure 12 in the manner described in more detail below in connection with FIGS. 2 and 3. One end of a conventional fiber optical bundle 14 is disposed in abutment with the other short side of prism or mirror 11. The other end of fiber optical bundle 14 is attached to support structure 12 at a location above platform 13 in co-planar relationship with a surface 15. Light from the source disposed inside base 10 is reflected from the hypotenuse of prism 11 into the adjacent end of fiber optical bundle 14. Thus, prism 11 and fiber optical bundle 14 serve to transmit the light from the source inside base 10 to surface 15. Positive or negative replicas of biological surface tissue such as skin or nails are formed in an opaque molding compound, such as the material used by dentists to take impressions. A suitable material is sold by Dow Corning Corporation under the trade name SILASTIC. Typically, a layer of the material one or two millimeters thick is applied to the biological surface area to be replicated. After the material cures, it is peeled off and placed on platform 13 for viewing. Such replicas are individually placed on platform 13 for viewing. Surface 15 and the end surface of fiber optical bundle 14 form an angle of approximately 30° with a vertical plane. Thus, assuming platform 13 is horizontal, light is directed from the end of fiber optical bundle 14 at an angle of approximately 30° to the surface of platform 13 to illuminate the specimen, i.e., replica, thereon. Magnifying means, which in this embodiment of the invention comprises a microscope 18, is secured to base 10 directly above platform 13 by conventional means not shown. Platform 13 is positioned in the field of view of microscope 18.

A cover 19 fits over microscope 18. Cover 19 is connected to base 10 by hinges 20. When cover 19 is pivoted on hinges 20 into open position, as shown in FIG. 1, microscope 18 is exposed. When cover 19 is pivoted by hinges 20 to a closed position (as shown in FIG. 1 of the referenced patent), microscope 18 is enclosed by cover 19. A screen 21 is mounted inside cover 19 in such a position that microscope 18 projects images from platform 13 onto screen 21 when cover 19 is in open position. Thus, the apparatus of FIG. 1 provides front illumination for an opaque replica to be viewed through microscope 18 or projected thereby onto screen 21.

To optimize viewability of the replica, platform 13 is tiltable and rotatable. As shown in FIGS. 2 and 3, platform 13 is supported on the end of a post 30 that slidably and rotatably fits in a bore 31 in the top of base 10 and a collar 32 fixed on the top surface of base 10. Normally, thumb screw 33, which has a threaded connection with collar 32, is tightened against post 30 to hold platform 13 in place. To rotate or move platform 13 vertically, thumb screw 33 is loosened, the adjustment is made, and thumb screw 33 is retightened. The underside of platform 13 has a yoke 34, and the top of post 30 has a rounded end 35 with flat sides that fit within yoke 34. A pin 36 is secured to yoke 34 and is free to rotate within a bore 37 of end 35. A thumb screw 38, which has a threaded connection with end 35, is normally tightened against pin 36 to secure platform 13. Platform 13 is designed to be tiltable to permit light to approach platform 13 at any angle approximately between 20° and 42° to platform 13. To tilt platform 13 to change the angle at which light approaches the replica, thumb screw 38 is loosened, the adjustment is made, and thumb screw 38 is retightened.

Nominally, surface 15 is at an angle of 30° to a vertical plane, platform 13 is in a horizontal plane, and coherent light impinges on the replica at an elevation angle of 30° to platform 13. The elevation angle at which optimum definition of the surface topography of the replica is obtained may vary from replica to replica, depending upon the nature of the surface topography. In some cases, the tilt of platform 13 is adjusted on a case by case basis for each particular replica to an elevation angle within a range of between 20° and 42° such that the optimum definition of the surface topography of the particular replica, i.e., resolution, is achieved in each case.

The direction of impinging coherent light from which optimum depth of field of the topography of the replica is obtained, i.e., the azimuth angle, also varies from replica to replica, depending upon the nature of the surface topography. Preferably, platform 13 is rotated for each replica until the direction of impinging light provides the optimum depth of field. As platform 13 is rotated through 360° and the direction from which the light approaches the replica changes accordingly, the depth of field changes from one extreme to the other, namely, from the appearance of positive topography at one angular position of platform 13 to the appearance of negative topography at another angular position of platform 13 180° from the position of positive topography. As used herein, the term "positive topography" refers to the true contour of the biological tissue specimen—peaks appearing as peaks and valleys appearing as valleys. The term "negative topography" refers to the inverse of the true contour of the specimen—peaks corresponding to valleys and valleys corresponding to peaks. The replica itself has negative topography in that it has the inverse contour of the specimen. By rotating the replica on platform 13 while viewing the replica so as to change the direction from which light impinges upon the replica, an angular position of platform 13 can be found where the replica appears with positive topography, even though the replica itself has negative topography. It is important in analyzing biological surface tissue that it be viewed with positive topography; negative topography can result in false diagnosis of skin characteristics, conditions, and disease. Thus, the invention permits the replica which has negative topography to be viewed with positive topography by rotation of platform 13.

The described embodiment of the invention is only considered to be preferred and illustrative of the inventive concept; the scope of the invention is not be be restricted to such embodiment. Various and numerous other arrangements may be devised by one skilled in the art without departing from the spirit and scope of this invention. For example, prisms and/or mirrors could be used instead of a fiber optical bundle to transmit light to the location above platform 13.

What is claimed is:

1. A method for illuminating a replica of biological surface tissue lying on a platform by means of light from a coherent light source, the method comprising the steps of:

forming a replica of the biological surface tissue with negative topography in a piece of opaque molding material;

placing the replica on the platform;

directing coherent light onto the platform such that the light impinges upon the replica at an acute elevation angle to the surface of the replica;

viewing the replica; and adjusting the azimuth angle from which the light impinges upon the replica while viewing the replica, until the replica appears with positive topography.

2. The method of claim 1, in which the directing step directs coherent light to impinge upon the replica at an acute elevation angle approximately between 20° and 42°.

3. The method of claim 1, in which the directing step directs coherent light to impinge upon the replica at an acute elevation angle of approximately 30°.

4. The method of claim 1, additionally comprising the elevation step of adjusting the angle.

5. The method of claim 1, additionally comprising the step of magnifying the replica prior to viewing same.

* * * * *